(12) United States Patent
Hoshi (10) Patent No.: US 8,169,505 B2
(45) Date of Patent: May 1, 2012

(54) IMAGE MANAGEMENT APPARATUS FOR DISPLAYING IMAGES BASED ON GEOGRAPHICAL ENVIRONMENT

(75) Inventor: Tsutomu Hoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 338 days.

(21) Appl. No.: 12/232,529

(22) Filed: Sep. 18, 2008

(65) Prior Publication Data

US 2009/0214082 A1 Aug. 27, 2009

(30) Foreign Application Priority Data

Feb. 22, 2008 (JP) ................................. 2008-041634

(51) Int. Cl.
*H04N 5/225* (2006.01)
*H04N 5/232* (2006.01)
*H04N 5/76* (2006.01)
*H04M 1/00* (2006.01)

(52) U.S. Cl. ............... 348/231.3; 348/207.1; 348/211.2; 455/556.1

(58) Field of Classification Search ............. 348/207.99, 348/207.1, 211.99–211.3, 231.3, 231.5, 231.6; 455/556.1
See application file for complete search history.

(56) References Cited

U.S. PATENT DOCUMENTS

| | | | | |
|---|---|---|---|---|
| 6,437,797 B1 * | 8/2002 | Ota | ............................... | 345/638 |
| 6,741,864 B2 * | 5/2004 | Wilcock et al. | ............ | 455/456.1 |
| 6,819,356 B1 * | 11/2004 | Yumoto | ..................... | 348/231.2 |
| 6,914,626 B2 * | 7/2005 | Squibbs | ..................... | 348/231.3 |
| 2002/0154221 A1 * | 10/2002 | Ishimaru | ..................... | 348/207.1 |

FOREIGN PATENT DOCUMENTS

| | | |
|---|---|---|
| JP | 2005-286378 | 10/2005 |
| JP | 2006-11580 | 1/2006 |
| JP | 2007-322847 | 12/2007 |
| JP | 2008-28648 | 2/2008 |

OTHER PUBLICATIONS

Japanese Office Action mailed Nov. 1, 2011 in corresponding Japanese Patent Application No. 2008-041634.

* cited by examiner

*Primary Examiner* — Daniel M Pasiewicz
(74) *Attorney, Agent, or Firm* — Staas & Halsey LLP (57) ABSTRACT

An image management apparatus capable of managing a plurality of images captured within a geographical range included in a designated map linked with that map. The image management apparatus has a period setting unit setting a predetermined period, an imaging unit acquiring an image, a position information acquisition unit acquiring capturing position information, a map information acquisition unit acquiring map information representing a predetermined geographical range, a judgment unit judging whether or not the imaging location corresponding to each of a plurality of images is included within the predetermined geographical range, a display position determination unit determining the display position of the imaging location judged to be included within the predetermined geographical range by the judgment unit among imaging locations, and a display unit displaying the imaging location judged to be included within the predetermined geographical range according to the display position.

14 Claims, 10 Drawing Sheets

IMAGE MANAGEMENT APPARATUS FOR DISPLAYING IMAGES BASED ON GEOGRAPHICAL ENVIRONMENT

FIELD

The embodiments discussed herein are related to an image management apparatus, more particularly relates to an image management apparatus managing image data linked with map information.

BACKGROUND

In recent years, mobile phones mounting cameras have come into wide use. Among such mobile phones, there are ones mounting global positioning systems (hereinafter referred to as "GPS"). Therefore, it has been proposed to link an image captured by a camera with position information measured by the GPS at the imaging location.

Further, an imaging information processing system acquiring first order map information representing a map including the imaging location from a server based on that position information, preparing second order map information attaching mark information indicating the imaging location onto that map, and displaying the same on a display has been developed (see Japanese laid-open Patent Publication (A) No. 2006-11580).

However, the apparatus disclosed in Japanese Patent Publication (A) No. 2006-11580 separately acquires maps including the imaging locations for the respective images when there are a plurality of captured images. For this reason, the linkages between acquired individual maps are not considered. Therefore, even when there are a plurality of captured images at close imaging locations, those plurality of captured images could not be referred to linked with one map.

SUMMARY

Accordingly, it is an object of the embodiment to provide an image management apparatus capable of managing a plurality of images captured within a geographical range included in a designated map while linking these with that map.

According to an aspect of the invention, there is provided an image management apparatus comprising a period setting unit setting a predetermined period, an imaging unit acquiring an image, a position information acquisition unit acquiring capturing position information indicating imaging locations at which images are acquired by the imaging unit, an image management unit linking the images and the capturing position information, a map information acquisition unit acquiring map information representing a designated predetermined geographical range, a judgment unit judging whether or not the imaging location corresponding to each of the plurality of images acquired by the imaging unit in a predetermined period is included within the predetermined geographical range, a display position determination unit determining the display position of the imaging location judged to be included within the predetermined geographical range by the judgment unit among imaging locations individually corresponding to the plurality of images, and a display unit displaying, on the map shown on the map information, the imaging location judged to be included within the predetermined geographical range according to the display position.

The image management apparatus disclosed in the present application has the effect that a plurality of images captured within the geographical range included in a designated map can be managed linked with that map.

BRIEF DESCRIPTION OF DRAWINGS

The features of the embodiments will be more apparent from the following description of the preferred examples given with reference to the accompanying drawings, wherein.

DESCRIPTION OF EMBODIMENTS

Preferred embodiments of the present invention will be described in detail below while referring to the attached figures. Below, an explanation will be given of an image management apparatus according to an embodiment with reference to the drawings. The image management apparatus according to the embodiment judges whether or not imaging locations are included within the range of the map for a plurality of images captured in a predetermined period on a map designated from a user and, when these are included in the range of that map, prepares second order map information displaying the imaging locations on that map and stores captured images corresponding to those imaging locations linked with the map.

Figure 1:
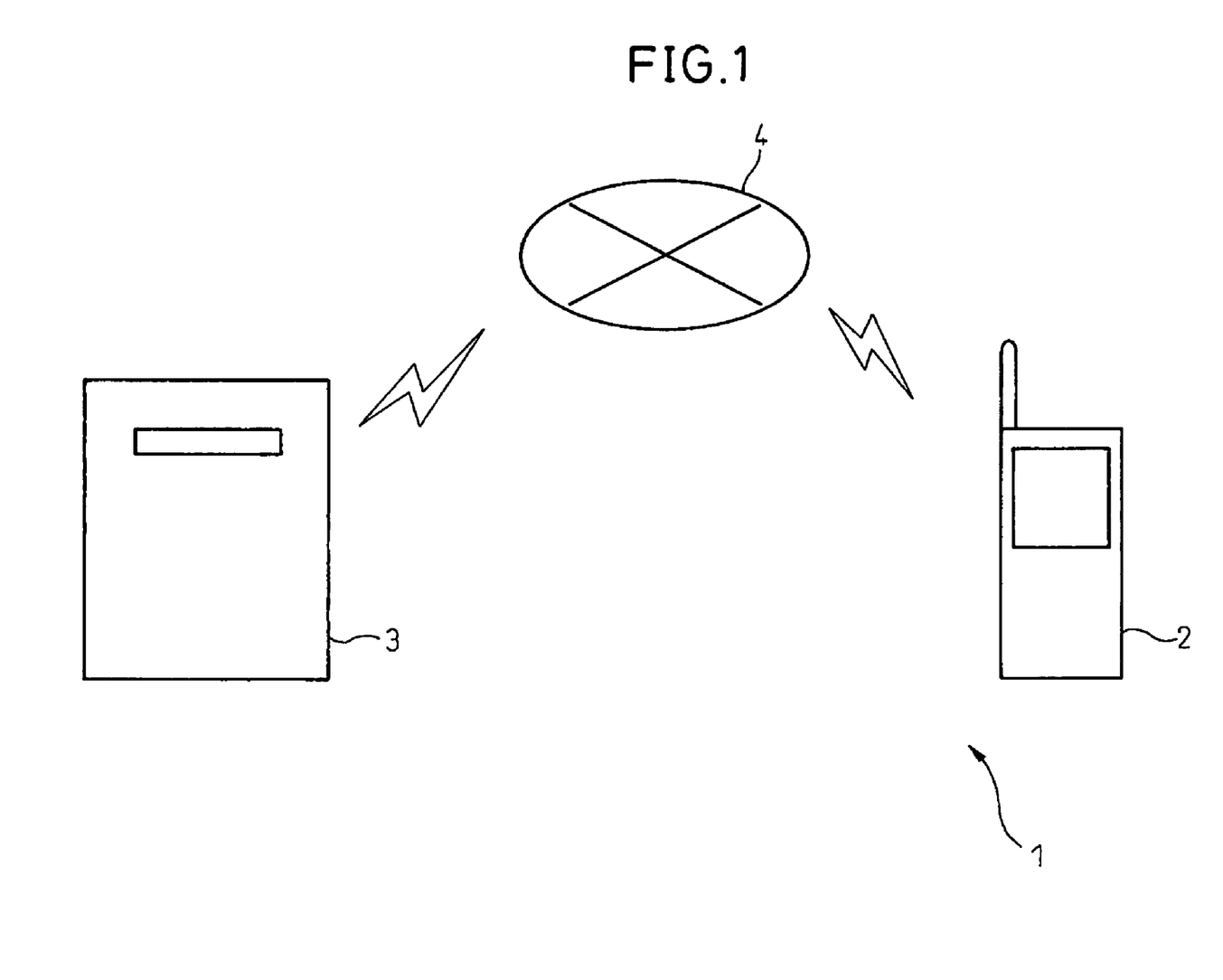
FIG. 1 is a schematic view of the configuration of an image management apparatus according to an embodiment of the present invention.
Figure 2:
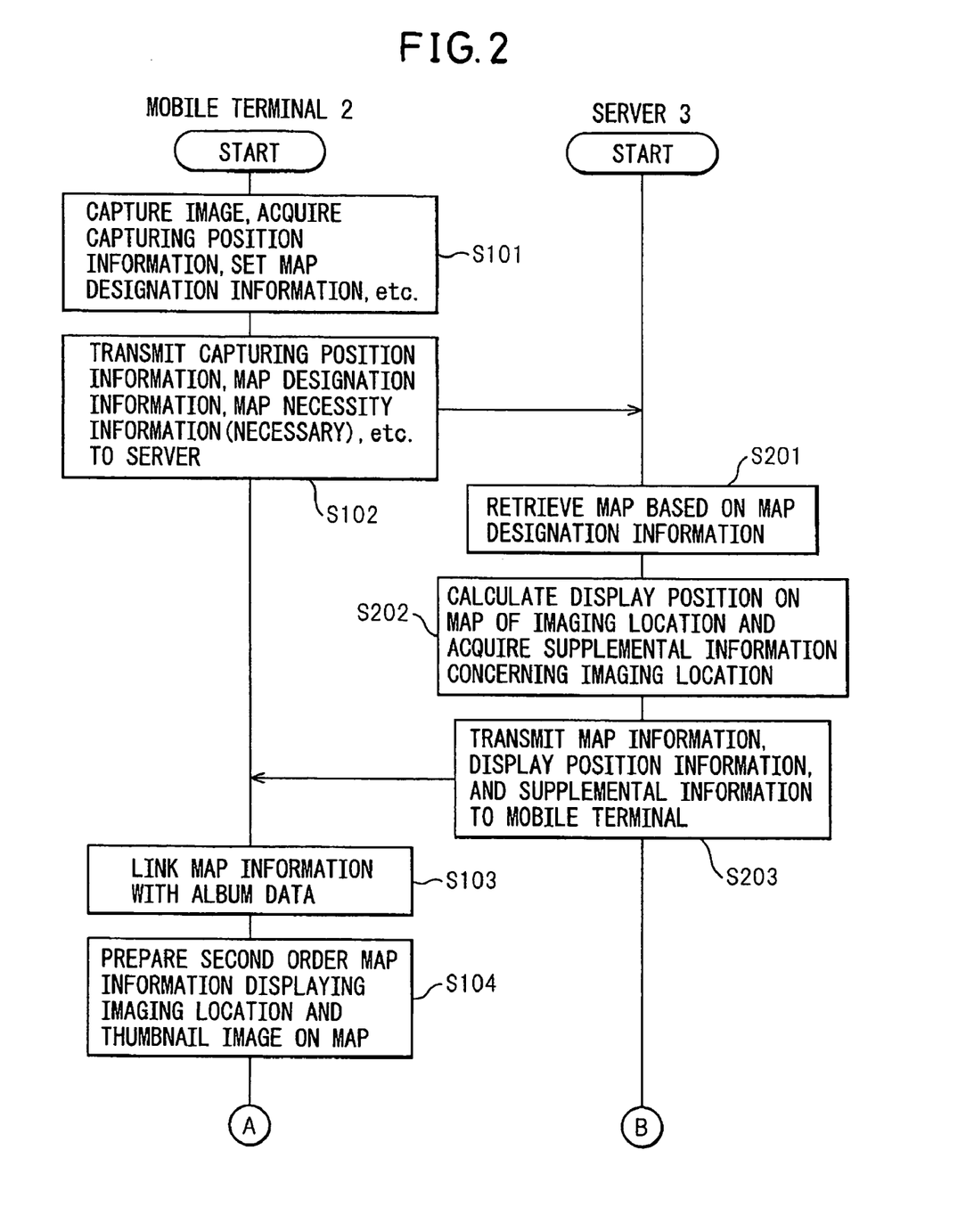
FIG. 2 is a timing chart of processing of the image management apparatus according to an embodiment of the present invention.
Figure 3:
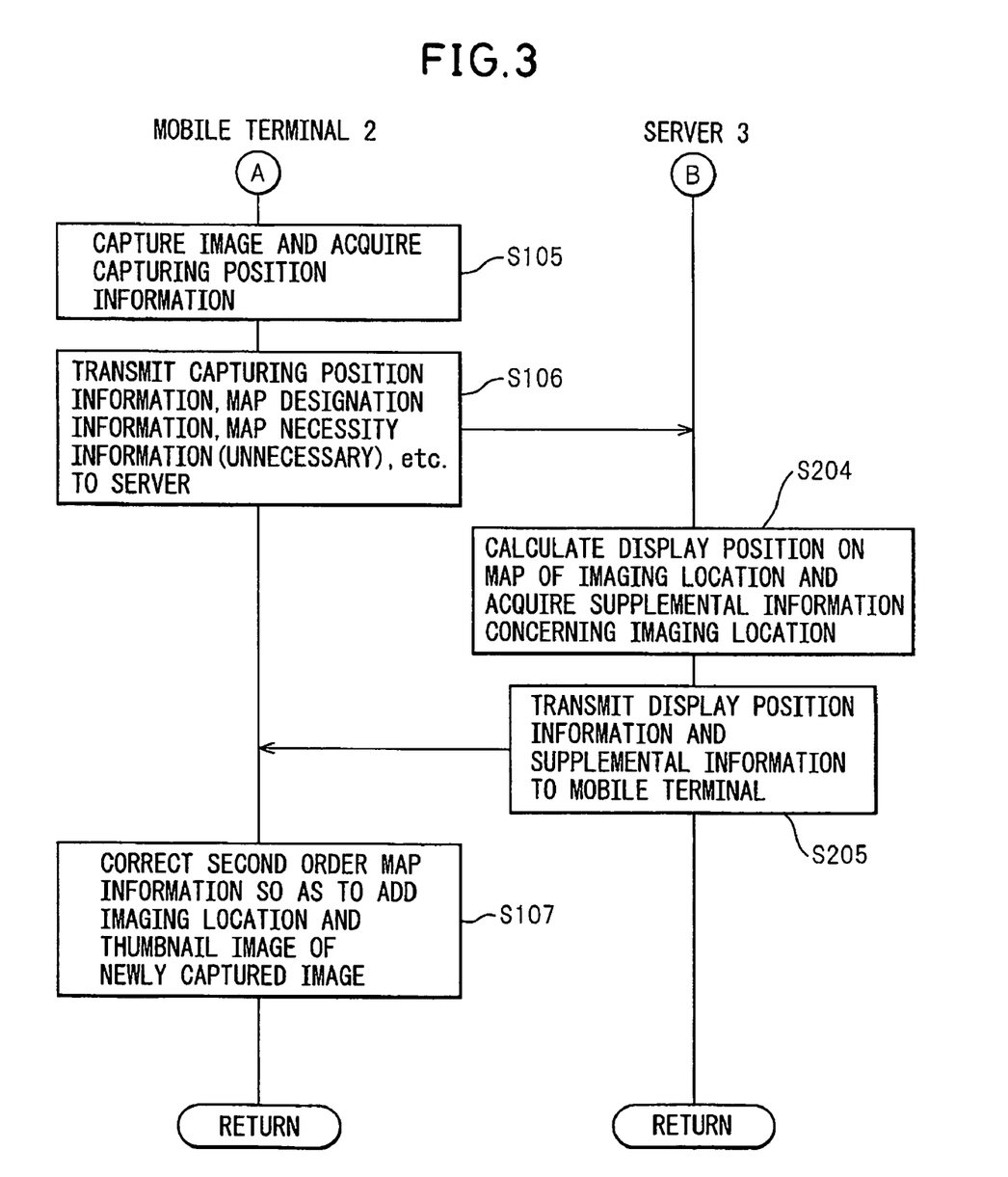
FIG. 3 is a timing chart of the processing of the image management apparatus according to an embodiment of the present invention.

FIG. 1 is a schematic view of the configuration of an image management apparatus 1 according to one embodiment. As shown in FIG. 1, the image management apparatus 1 has a mobile terminal 2 and a server 3. The mobile terminal 2 and the server 3 are linked via a public wireless line and can communicate with each other. The user operates the mobile terminal 2 and can manage images captured in a predetermined period linked with the map acquired from the server 3 as an album. FIG. 2 and FIG. 3 show timing charts of processing by the image management apparatus 1. As shown in FIG. 2, in the mobile terminal 2, when the album application is activated and an image is captured during a period designated by that application, the mobile terminal 2 measures the position of that imaging location by a GPS. Further, by designation of the user, map necessity information showing the necessity of a map for linking the captured image and map designation information designating a geographical range etc. to be displayed are set (step S101). Then, the mobile terminal 2 transmits imaging position information indicating the imaging location (latitude and longitude), map designation information, map necessity information, a supplemental information acquisition request, and album management information to the server 3 (step S102). Here, when the mobile terminal 2 has not acquired the map information, the map necessity information has a value indicating the acquisition of a map. Further, the supplemental information acquisition request is, if there is supplemental information linked with the imaging location (for example, information of an event held at that imaging location), a signal requesting sending of that supplemental information to the mobile terminal 2. Further, the album management information, as will be explained later, includes a period, location, type, etc. managed as album data.

On the other hand, the server 3, based on the map designation information received from the mobile terminal 2, retrieves the map information including the designated geographical range from a map database (step S201). Then, the server 3 computes the display position of the imaging location on the map (step S202). Further, the server 3 checks for presence of any supplemental information linked with that imaging location. Then, the server 3 transmits the map information, display position information indicating the display position of the imaging location, and supplemental information to the mobile terminal 2 (step S203).

When receiving the map information, the mobile terminal 2 links that map information with the album data. Further, the mobile terminal 2 links image data related to the simultaneously received display position information with the map information (step S103). Further, the mobile terminal 2 corrects the map information based on the display position information, prepares second order map information attaching a mark representing the imaging location and a thumbnail image of the captured image data onto that map, and displays the same on the display (step S104).

As shown in FIG. 3, after that, when an image is newly captured at the mobile terminal 2 and the image data is acquired, the position of that imaging location is measured (step S105). Then, the mobile terminal 2 transmits the capturing position information, map designation information, map necessity information, and album management information concerning the newly captured image data to the server 3 (step S106). Further, the mobile terminal 2, if necessary, transmits also the supplemental information acquisition request to the server 3. Note that, in this case, the mobile terminal 2 has already received the map, therefore the map necessity information has a value indicating that a map is unnecessary.

On the other hand, the server 3 specifies the map based on the received map designation information. Then, based on the received capturing position information, in the same way as step S202, the server 3 computes the display position on the specified map of the imaging location of the newly captured image data (step S204). Further, when it has received the acquisition request of the supplemental information, the server 3 checks for presence of any supplemental information related to that imaging location. Then, the server 3 transmits the display position information and/or supplemental information concerning the newly captured image data to the mobile terminal 2 (step S205). Note that, in this case, the map necessity information indicates that the map is unnecessary, therefore the map information is not transmitted.

The mobile terminal 2, when receiving the display position information from the server 3, corrects the second order map information, attaches a mark representing that new imaging location and a thumbnail image of the newly captured image data, and displays the same on the display (step S107). Below, a detailed explanation will be given of the mobile terminal 2 and server 3.

Figure 4:
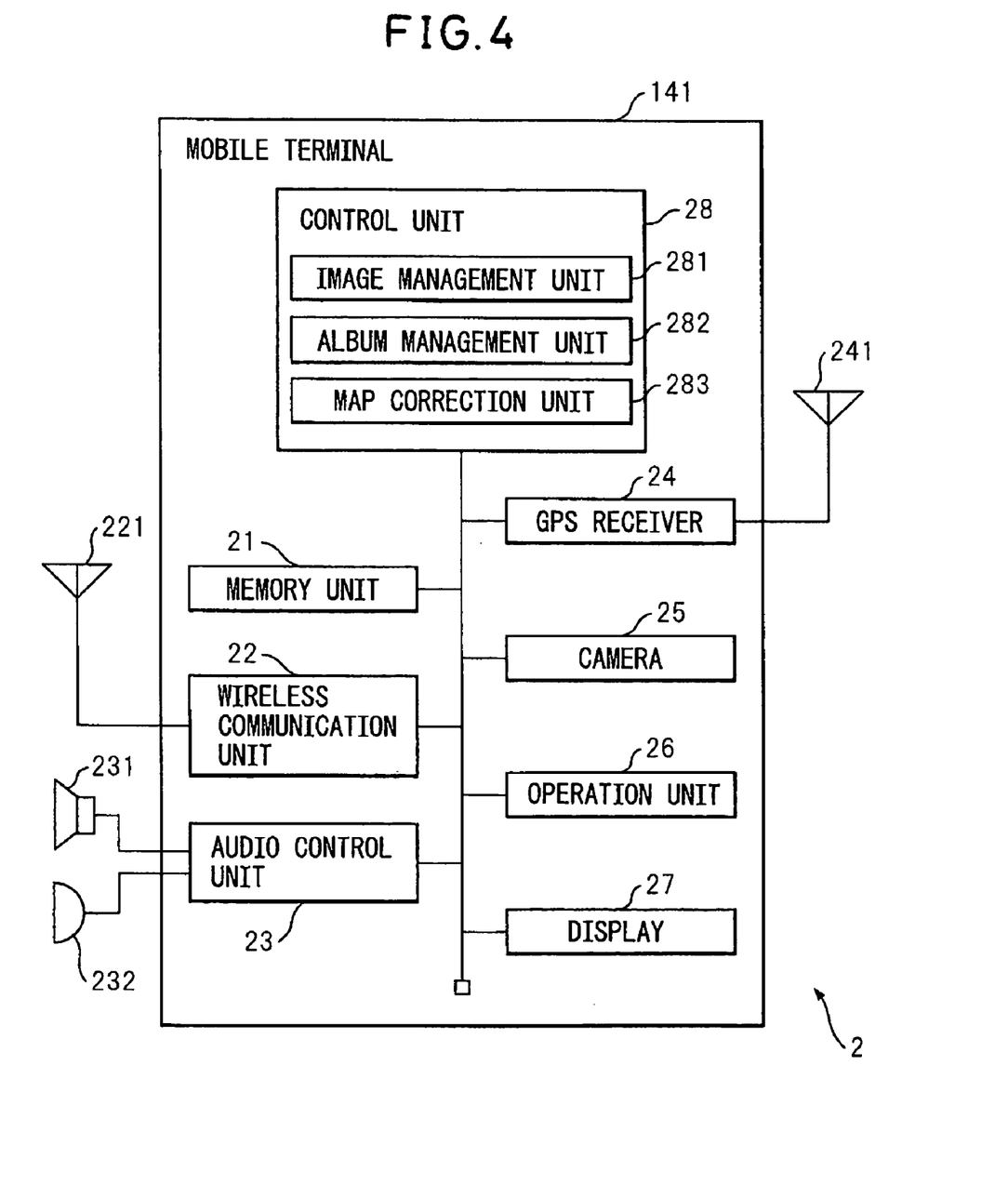
FIG. 4 is a functional block diagram of a mobile terminal used in an embodiment of the present invention.

FIG. 4 shows a functional block diagram of the mobile terminal 2. As shown in FIG. 4, the mobile terminal 2 has a memory unit 21, wireless communication unit 22, audio control unit 23, GPS receiver 24, camera 25, operation unit 26, display 27, and control unit 28.

The memory unit 21, for example, has an electrically rewritable nonvolatile memory. The memory unit 21 stores various programs for controlling the mobile terminal 2, parameters, image data captured by using the camera 3, map information received from the server 3, etc.

The wireless communication unit 22 has a communication control use processor, a wireless communication interface, and peripheral circuits of the same and is connected to an antenna 221. The wireless communication unit 22 communicates with the server 3 or other communication terminal via the antenna 221 and public wireless line 4. Further, the wireless communication unit 22 is connected to the control unit 28 and sends to the control unit 28, among the information received from the other communication terminal, for example map information received from the server 3 and other information to be processed at the control unit 28. Further, the wireless communication unit 22 transmits information requested to be transmitted from the control unit 28 to another communication terminal. Further, the wireless communication unit 22 transfers audio speech information received from the other mobile terminal to the audio control unit 23.

The audio control unit 23 has an audio control use processor, an audio interface unit (AIU), and peripheral circuits of the same and is connected to a speaker 231 and a sound collection microphone 232. The audio control unit 23 processes for example information concerning audio speech. For this purpose, the audio control unit 23 processes audio collected via the sound collection microphone 232, converts this to electric signals, and transfers those electric signals to the wireless communication unit 22 for transmission to another communication terminal. Conversely, the audio control unit 23 receives electric signals concerning audio received from another communication terminal via the public wireless line 4 from the wireless communication unit 22 and converts this to audio via the speaker 231. Further, the audio control unit 23 is linked to the control unit 28 and processes information concerning audio in response to requests from various applications operating on the mobile terminal 2. For example, the audio control unit 23 generates a shutter sound via the speaker 231 simultaneously with the capturing performed by the camera 25.

The GPS receiver 24 serving as the position information acquisition unit has an interface circuit which is connected to an antenna 241 and receives the position measurement information transmitted from a GPS satellite via the antenna 241. Further, the GPS receiver 24 is connected to the control unit 28, receives the position measurement information in response to the request from the control unit 28, and transfers that position measurement information to the control unit 28.

The camera 25 serving as the imaging unit has opto-electric conversion elements (for example, CCD sensors or C-MOS's) arrayed in two dimensions and outputting electric signals in accordance with a received light amount and a focus optical system for forming an image on the opto-electric conversion elements. Further, the camera 25 is connected to the control unit 28 and acquires image data in response to the request from the control unit 28. Then, the camera 25 transfers the acquired image data to the control unit 28.

The operation unit 26 is configured by a plurality of button switches etc. and sends signals in accordance with the operation of the user to the control unit 28. For this reason, the user can make the mobile terminal 2 perform a predetermined operation by operating the operation unit 26 according to instructions of the application operating in the mobile terminal 2. The display 27 serving as the display unit is configured by for example a liquid crystal display or organic EL display. The display 27 displays data received from the control unit 28. Note that, by configuring the operation unit 26 and display 27 by a touch panel display, these can be integrally formed.

The control unit 28 has one or more not shown microcomputers configured by CPUs, ROMs, RAMs, etc. and their peripheral circuits. The control unit 28 controls the operations of the units of the mobile terminal 2 according to various applications operating on the mobile terminal 2. Further, the control unit 28 has, as functional modules realized by computer programs executed on the microcomputers, an image management unit 281, an album management unit 282, and a map correction unit 283.

The image management unit 281, when an image is captured by the camera 25 and image data is acquired, acquires from the GPS 24 the position measurement information at the time of capture. Then, the image management unit 281 links that position measurement information as the capturing position information indicating the position of the imaging location with the acquired image data. The capturing position information includes the latitude and longitude of the imaging location and identification information of the linked image data (image ID). Further, the image management unit 281 transmits the capturing position information via the wireless communication unit 22 to the server 3. Further, the image management unit 281, when receiving the supplemental information related to that imaging location from the server 3, links the supplemental information with the acquired image data. At that time, when the image data which has been already acquired and the newly acquired image data are close enough to an extent that these are regarded as the same location on the map, links the supplemental information concerning the already acquired image data with that newly acquired image data.

Figure 5:
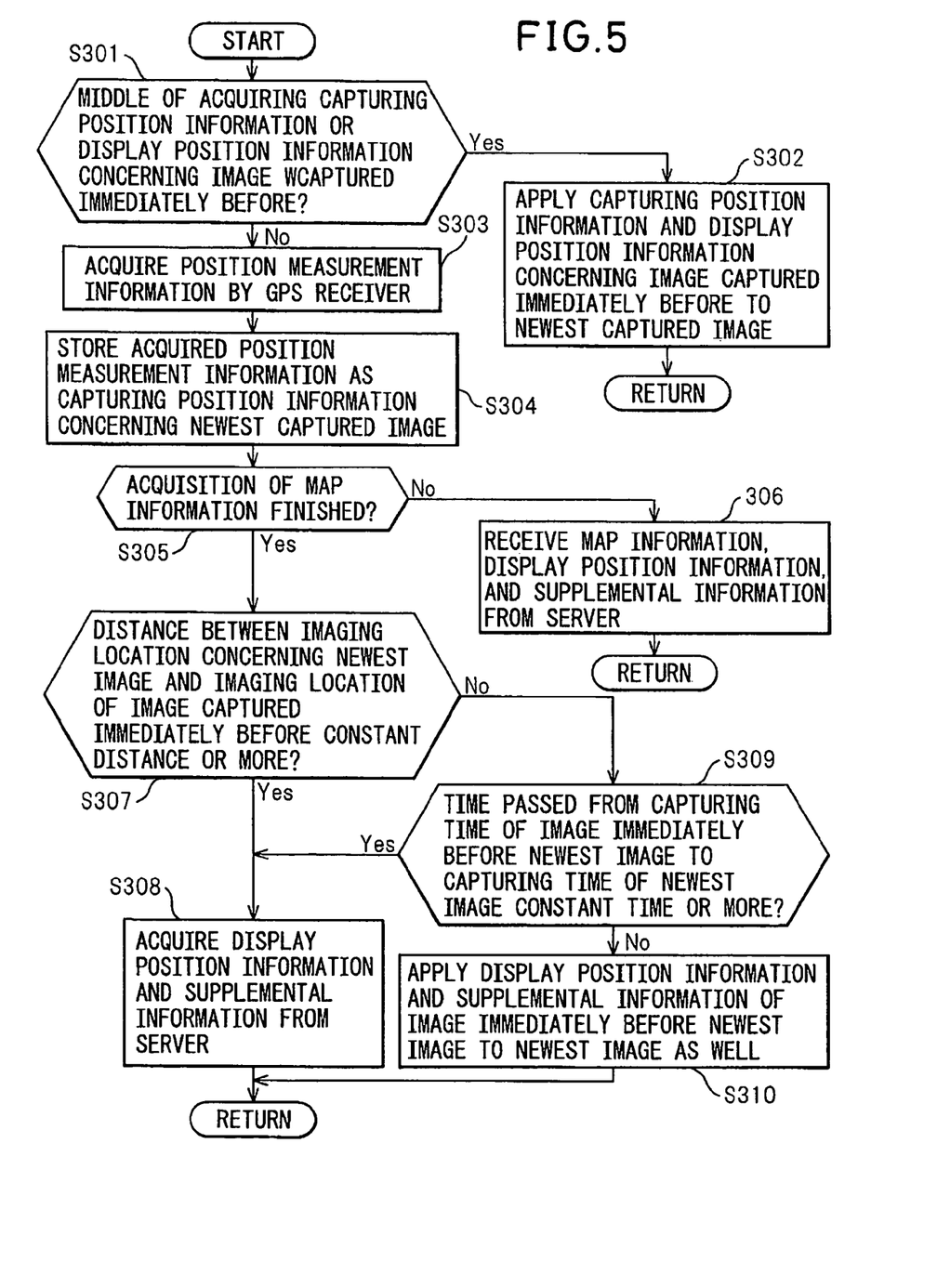
FIG. 5 is a flow chart showing an operation of an image management unit of the mobile terminal.

Referring to the flow chart depicted in FIG. 5, the operation of the image management unit 281 will be explained. First, when an image is captured by the camera 25 and the image data is newly acquired, the image management unit 281 judges whether or not the GPS receiver 24 is in the middle of acquisition of the position measurement information in order to acquire capturing position information concerning image data which was captured immediately before and whether or not the display position information concerning the image data which was captured immediately before has been received from the server 3 (step S301). Then, if in the middle of acquiring capturing position information or display position information concerning image data which was captured immediately before, the image management unit 281 sets the capturing position information and display position information of the newly captured image data to the same as the capturing position information and display position information concerning the image data which was captured immediately before (step S302). In the same way, the supplemental information acquired for the image data which was captured immediately before is linked with the newly captured image data. After that, the image management unit 281 ends the processing.

On the other hand, at step S301, in the case where the capturing position information and display position information concerning the image data which was captured immediately before have been already acquired, the image management unit 281 acquires the position measurement information representing the present position via the GPS receiver 24 (step S303). Note that, in this case, in order to enable continuous capturing, preferably the apparatus is configured so that the control module of the camera and the control module of the GPS receiver 25 can operate in parallel so that the camera 25 can operate even during position measurement. Then, the image management unit 281 links that position measurement information as the capturing position information indicating the imaging location with the image data and stores the same together with the image data in the memory unit 21 (step S304).

Next, the image management unit 281 judges whether or not the map information to be linked with the image data has been already acquired (step S305). Then, when the map information has not yet been acquired, the image management unit 281 accesses the server 3 via the public wireless line 4 and transmits, together with the acquisition request of the position information and supplemental information, the map necessity information indicating to request the acquisition of the map, the map designation information, and the album management information. Then, it acquires from the server 3 the map information and the display position information and supplemental information corresponding to the newly captured image (step S306). After that, the image management unit 281 ends the processing. On the other hand, at step S305, when the map information has been already acquired, the image management unit 281 judges whether or not the imaging location concerning the newly acquired image data is separated from the imaging location of the image data which was captured the previous time by a constant distance or more (step S307). Note that, the constant distance may be, for example, a diameter of the range displayed as one point on the display 27 when the geographical range included in the map information is displayed on the display 27. Alternatively, that constant distance may be a fixed distance (for example, 100 m or 1 km) determined in advance. Then, when the imaging location concerning the newly acquired image data is separated from the imaging location of the image data which was captured the previous time by the constant distance or more, the image management unit 281 accesses the server 3 via the public wireless line 4 by the wireless communication unit 22 and transmits the acquisition request of the capturing position information and supplemental information. Note that, the image management unit 281 transmits the map designation information and the map necessity information indicating not to request the acquisition of the map to the server 3. Then, from the server 3, it receives the display position information and supplemental information corresponding to that newly captured image (step S308). After that, the image management unit 281 ends the processing.

On the other hand, at step S307, in a case where the distance between the imaging location concerning the newly acquired image data and the imaging location of the previous captured image data is less than the constant distance, the image management unit 281 judges whether or not a constant time or longer has passed from the position measurement at the time of the previous capture to when this time position measurement is carried out (step S309). Then, when the constant time or longer has passed, the image management unit 281 accesses the server 3 and receives the display position information and supplemental information (step S308). After that, the image management unit 281 ends the processing. On the other hand, at step S309, when the passed time is less than the constant time, the image management unit 281 does not access the server 3, but uses the display position information and supplemental information concerning the image which was captured immediately before as the display position information and supplemental information of the newly captured image (step S310). Then, the image management unit 281 ends the processing. Note that, the above constant time is set to a value of for example 5 minutes or 1 hour by the user via the operation unit 26. Alternatively, it may be set so that the constant time becomes longer as the geographical range shown in the map information becomes broader. As described above, in a case where predetermined conditions are satisfied, by linking the supplemental information acquired for the image which was captured immediately before with the newest captured image, the amount of communication between the mobile terminal 2 and the server 3 can be made smaller. Further, as described above, it is not necessary to consider both of the distance between the imaging locations concerning the newest captured image and the captured image which was captured immediately before and a time difference of capturing times. If one of that distance or time difference is the predetermined threshold value or less, it is also possible to judge that the supplemental information acquired for the image which was captured immediately before is linked with the newest captured image.

As described above, in a case where the distance between the imaging location concerning the image which was captured immediately before and the imaging location concerning the newly captured image is short or a case where the time difference between the capturing time concerning the image which was captured immediately before and the capturing time concerning the newly captured image is short, by applying the information acquired concerning the image which was captured immediately before to the newly captured image, the amount of communication between the mobile terminal 2 and the server 3 can be reduced.

The album management unit 282 links various management information of the album data to be prepared and the map information and image data. Further, the album management unit 282 corresponds to the period setting unit setting the period managed as the album data. For this purpose, when newly preparing the album data, the album management unit 282 acquires album management information via the operation unit 26. The album management information includes, for example, the period, place, date of start, date of end, name and identification number of the album data, type (for example, "travel" and "golf") managed as album data. The album management unit 282 stores the acquired album management information in the memory unit 21. Further, the album management unit 282 makes the user designate a map for linking the image data which was captured during the management period linked with the designation of the place. For this purpose, the album management unit 282 acquires the map designation information for designating the map via the operation unit 26. For example, the map designation information are the center location of the map and distances from that center location up to the borders at the north, south, east, and west. Further, the map designation information may be landmark information (information representing a predetermined area or facility, for example, "Okinawa Prefecture" or "Fujitsu Golf Links").

The map designation information is transmitted together with the capturing position information concerning the image data to the server 3 during the management period of the album data. Then, when receiving the map information acquired based on the map designation information from the server 3, the album management unit 282 stores that map information in the memory unit 21 linked with the album data. Further, during the management period, the album management unit 282 stores that image data in the memory unit 21 linked with the album data whenever new image data is acquired.

Figure 6:
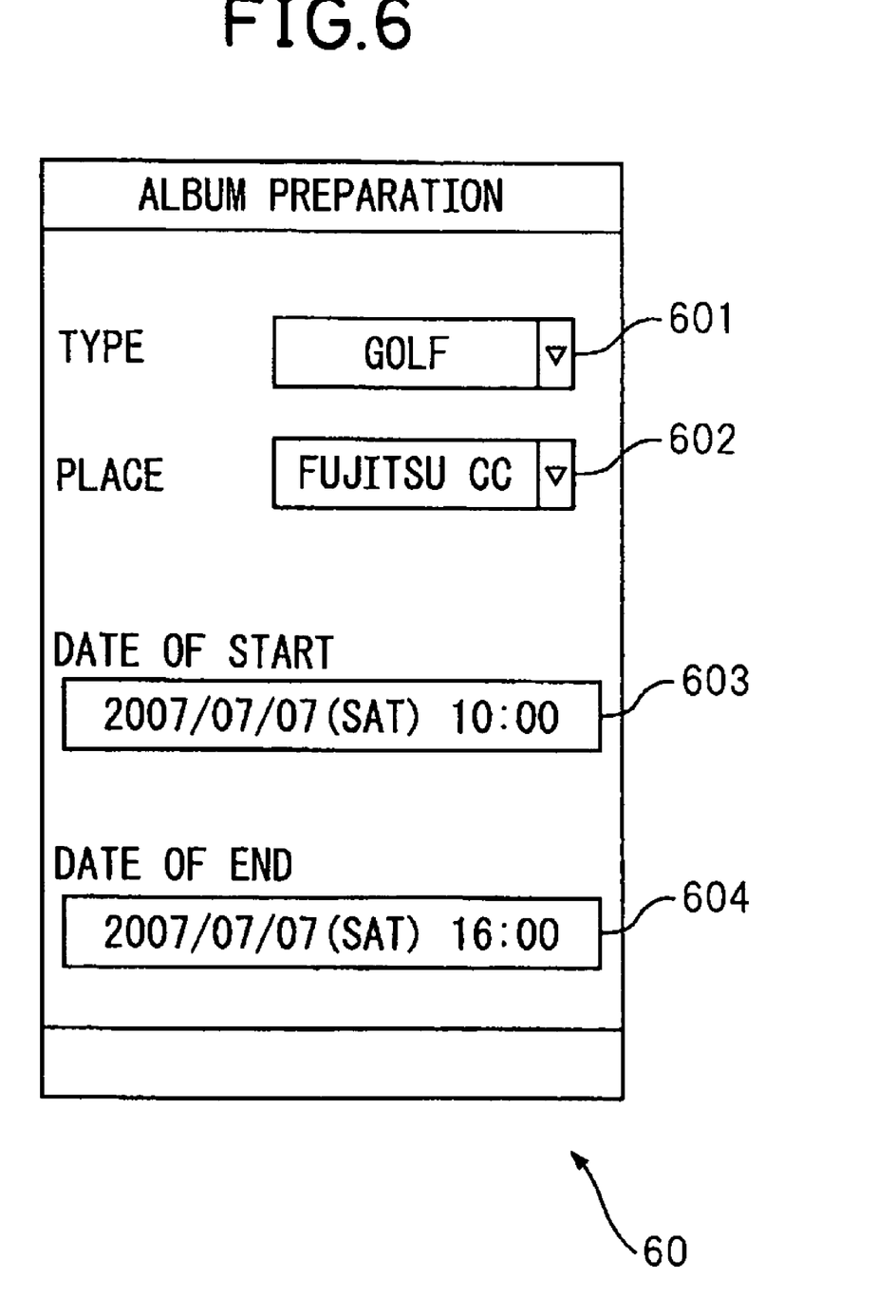
FIG. 6 is a diagram depicting an example of a display screen at the time of preparation of album data.

FIG. 6 shows an example of a screen displayed on the display 27 when the album data is newly prepared. As shown in FIG. 6, a display screen 600 at the time of preparation of an album displays an input box 601 for inputting the type, an input box 602 for inputting the place, an input box 603 designating the date of start of starting the management of the captured image as the album data, and an input box 604 designating the date of end of ending the management of the captured image as the album data. Then, by the user operating the operation unit 26 and inputting predetermined items to input boxes, the album data is prepared. In this embodiment, the input box 602 concerning the place has information designating the landmark input to it. Then, the album management unit 282 prepares the map designation information from that information designating the landmark. Alternatively, in order to prepare the map designation information, the album management unit 282 may make the display 27 separately display a screen for inputting required information. Further, an input box for inputting the name of the album data may be provided on the display screen for the preparation of album data. Note that, the identification number of the album data is automatically given by the album management unit 282. The identification number is made a number uniquely determined with respect to each album data so that the data can be discriminated from other album data.

Figure 7:
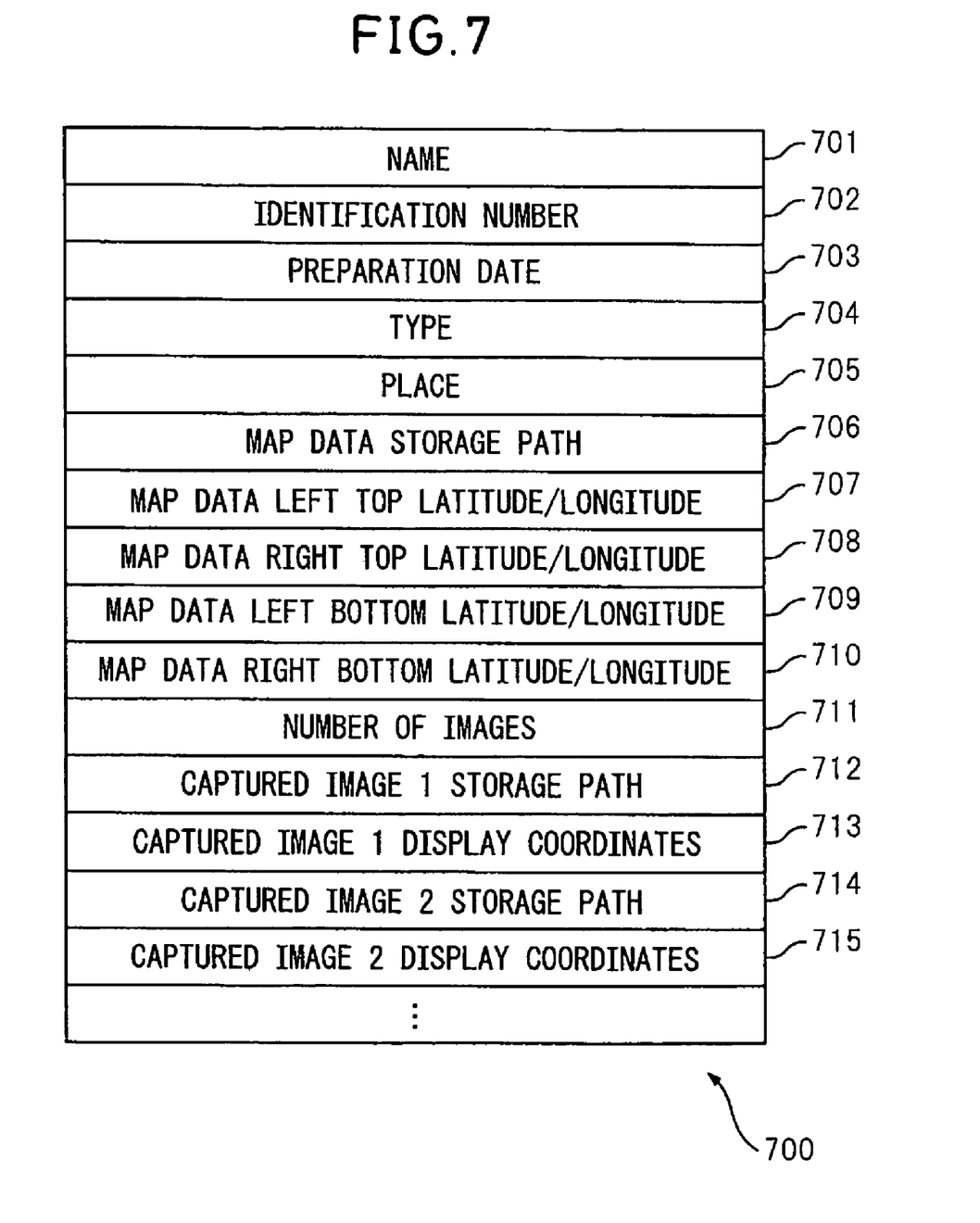
FIG. 7 is a diagram depicting an example of a format of the album data.

FIG. 7 shows an example of the format of the album data. As shown in FIG. 7, an album data format 700 includes the album management information described above, that is, a name 701 of that album data, an identification number 702, a preparation date 703, a type 704, and a place 705. Further, the album data format 700 includes a map data storage path 706 indicating the position in the memory unit 21 at which the map information linked with that album data is stored and latitude/longitude information 707 to 710 at four corners of the map data included in the map information. Further, the album data format 700 includes a stored image number 711, the storage path showing the position in the memory unit 21 of each stored captured image data, and display position coordinates 712 to 715 on the map data. Further, the album data format may include a supplemental information storage path showing the position in the memory unit 21 at which the supplemental information related to each image data is stored. In the same way, the album data format may include a comment input by the user via the operation unit 26 linked with each image data.

The map correction unit 283, when receiving the display position information representing the display position on a map of the imaging location of each image data from the server 3, prepares the second order map information attaching the mark representing the imaging location and the thumbnail image of the captured image data onto the map included in the map information. Further, where such second order map information has been already prepared and when further receiving the display position information concerning the newly captured image data from the server 3, the map correction unit 283 corrects that second order map information. Specifically, the map correction unit 283 adds the mark representing the imaging location of the newly captured image data and the thumbnail image of that image data to the second order map information.

When the second order map information is prepared, the control unit 28 displays that second order map information on the display 27 in a case where it receives a request of displaying the album data automatically or via the operation unit 26.

Further, when receiving a request of displaying an image acquired at an imaging location not included within the geographical range shown in the map information included in the album data image via the operation unit 26, the control unit 28 displays this on the display 27 separately from the map information.

Figure 8:
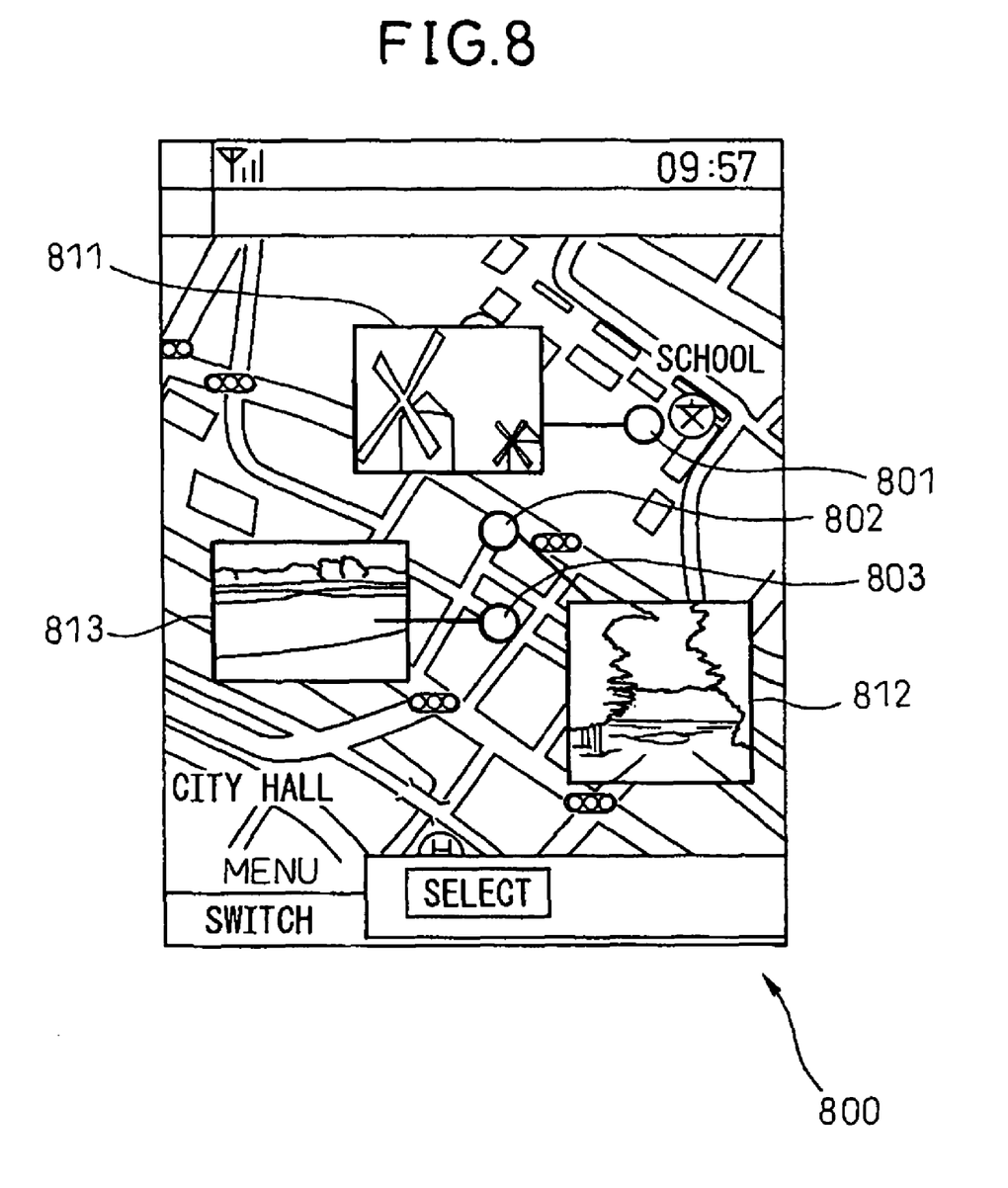
FIG. 8 is a diagram depicting an example of second order map information.

FIG. 8 illustrates an example of the second order map information displayed on the display 27. In FIG. 8, round marks 801 to 803 shown on a map 800 represent imaging locations. Then, images 811 to 813 linked with the round marks 801 to 803 by lines are thumbnail images of images captured at those imaging locations. As apparent from FIG. 8, by referring to this second order map information, the user can easily grasp at which place what image was captured. Note that, the display use data corresponding to the second order map information may be made image data larger than a size which can be displayed on the display 27. In this case, preferably, it is possible to scroll the second order map information displayed on the display 27 by the operation via the operation unit 26.

Figure 9:
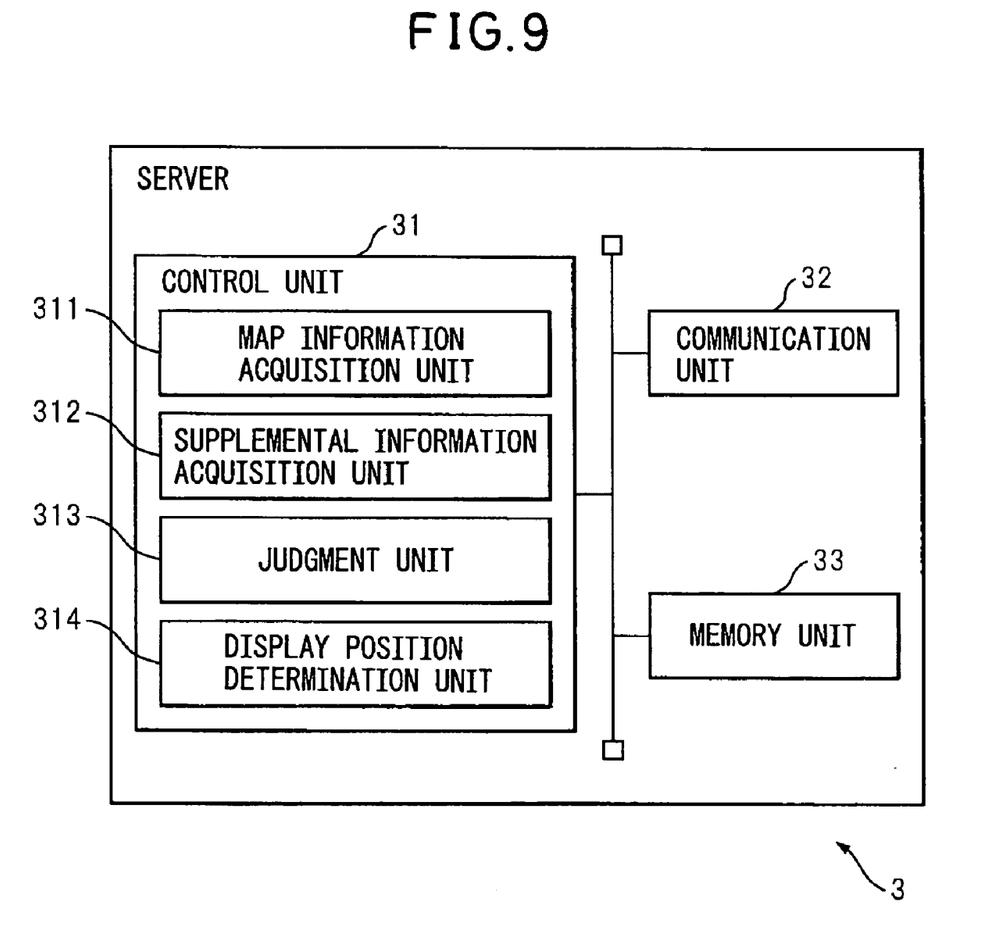
FIG. 9 is a function block diagram of a server used in an embodiment of the present invention.

Next, an explanation will be given of details of the server 3. FIG. 9 is a functional block diagram of the server 3. The server 3 has a control unit 31 configured by a CPU and its peripheral circuit, a communication unit 32 configured by a communication interface for communication with another communication terminal and its peripheral circuits, and a memory unit 33 configured by a magnetic disc, an optical disc, or other storage medium and its reading device etc. Further, the control unit 31 has, as functional modules loaded by programs run on the CPU, a map information acquisition unit 311, a supplemental information acquisition unit 312, a judgment unit 313, and a display position determination unit 314.

Here, the memory unit 33 stores a map database. That map database includes, for example, map information of areas in Japan and foreign countries. That map database may have several types of map information according to scales. Further, the map database may have map information corresponding to landmarks linked with the identification information of the landmarks. Further, the memory unit 33 stores a supplemental information database. The supplemental information is information such as events linked with certain locations. For example, the supplemental information includes the name and content of an event held at a location, waiting times of attractions of a theme park if that location is a theme park, distances from a location to a green, pond, and bunker and a wind velocity if that location is a golf course, and so on. Further, information representing the position such as the latitude/longitude of the location covered is linked with the supplemental information.

When receiving the map designation information from the mobile terminal 2 via the communication unit 32, the map information acquisition unit 311 retrieves the most suitable map information from the map information stored in the memory unit 33 based on that map designation information. For example, when the map designation information is designated as a geographical range including the center location and distances up to the borders, the map information acquisition unit 311 selects a map in which the number of pixels included within the designated geographical range is nearest a predetermined number of pixels (for example, 480×320 pixels) from among maps stored in the memory unit 33 which differ in scale. Alternatively, the map information acquisition unit 311 may select a map in which the number of pixels of the map included within the designated range is nearest the number of pixels of the display 27. Then, the map information acquisition unit 311 acquires the map information so that the center location shown in the map designation information becomes the center of the map and the designated range is included in the map designation information. Further, in a case where the map designation information is landmark information, the map information acquisition unit 311 acquires the map information linked with the identification information matching with the identification information of the landmarks included in that information from the memory unit 33.

Further, the map information acquisition unit 311 acquires the identification information of the acquired map information and the scale information of the map included in that map information. The map information acquisition unit 311 stores the map information, identification information, and scale information in the memory unit 33 separately from the map database linked with the album management information received together with the map designation information from the mobile terminal 2. Further, in a case where the map necessity information received from the mobile terminal 2 is the value indicating requesting of a map, the map information acquisition unit 311 transmits the map information, identification information, and scale information to the mobile terminal 2.

The supplemental information acquisition unit 313 extracts from the memory unit 33 the supplemental information concerning the location matching with the imaging location shown by the position information received from the mobile terminal 2. Then, the supplemental information acquisition unit 312 transmits the acquired supplemental information to the mobile terminal 2. Note that, the supplemental information acquisition unit 312 may acquire various types of supplemental information via the communication unit 32 from another server etc. and select the supplemental information concerning the location matching with the imaging location from among those.

The judgment unit 313 judges whether or not the imaging location indicated by the capturing position information received from the mobile terminal 2 is within the geographical range shown in the map information specified by the map designation information which is received simultaneously with the capturing position information. When judging that the imaging location is within that geographical range, the judgment unit 313 attaches a flag indicating that the location is included within the geographical range shown in the specified map information to the position information thereof and stores the same in the memory unit 33. Conversely, when judging that the imaging location is out of the geographical range, the judgment unit 313 attaches a flag indicating that the location is not included within the geographical range shown in the specified map information to the position information and stores the same in the memory unit 33.

When the imaging location is within the geographical range shown in the map information, the display position determination unit 314 computes the display position thereof on the map. For this purpose, when determining the map information displayed on the display 27 of the mobile terminal 2 as the image data, the display position determination unit 314 searches for the position of the pixel corresponding to the imaging location on that image data. Therefore, the display position determination unit 314 defines any of the four corners (for example end point of northwest) of the geographical range shown in the map information as a standard point and represents the other corners by predetermined values indicating the display range. For example, it is assumed that the four corners (A, B, C, D) of the geographical range shown in the map information have the following latitudes and longitudes:

A (E127°25', N26°13')
B (E128°51', N26°15')
C (E127°31', N25°02')
D (E128°57', N25°04')

Here, the C point located on the northwest end is defined as the standard point. This is represented by the coordinates (0,0). Then, when the predetermined value is 100, the display position determination unit 314 represents the A point located on the southwest end, the B point located on the southeast end, and the D point located on the northeast end by the coordinates (0,100), (100,100), and (100,0). Further, by dividing the difference of latitude and the difference of longitude from that standard point to the imaging location by a width between south and north and a width between east and west of that geographical range, the display position determination unit 314 finds a ratio of an east/west direction and a north/south direction of the distance from the standard point up to the imaging location with respect to the geographical range. Then, the display position determination unit 314 multiples the above predetermined value by that ratio and determines the display position corresponding to the imaging location. For example, when the latitude and longitude of the imaging location are (E128°41, N25°59'), the display position of the imaging location becomes (88, 78).

When the display position of the imaging location is found, the display position determination unit 314 stores that display position in the memory unit 33 linked with the corresponding position information and map information. Further, the display position determination unit 314 transmits that display position to the mobile terminal 2. Note that, for an imaging location not included within the geographical range shown in the map information, the display position determination unit 314 transmits a predetermined value (for example, (−1,−1)) indicating it is out of the map to the mobile terminal 2 as the display position information. The mobile terminal 2 multiplies the ratio of the above predetermined value and numbers of pixels in the east/west direction and north/south direction of the image data of the map corresponding to the second order map information with the display position for the imaging location to determine the display position. For example, assume that, for the display position shown in the above example, the image data of the map corresponding to the second order map information has 240 pixels in the east/west direction and has 320 pixels in the north/south direction and that the east/west direction is displayed in a horizontal direction and the north/south direction is displayed in a vertical direction. At this time, on the image data of that map, the coordinates of the imaging location become 211(=88×240/100) concerning the horizontal direction and become 250 (=320×78/100) concerning the vertical direction.

As explained above, the image management apparatus according to one embodiment can manage one map information designated in the album data linked with a plurality of image data captured during a predetermined period. Then, on the designated map, the second order map information attaching the imaging location of the captured image data and the thumbnail image of that image data is prepared. Therefore, by viewing that second order map information, during the album preparation period, the user can easily grasp at which place what image was captured. Further, in such an image management apparatus, when receiving the designated map information from the server 3, the mobile terminal 2 does not request the acquisition of map information after that even if newly capturing an image and receives only the display position information and supplemental information on the map corresponding to that imaging location from the server 3. For this reason, such an image management apparatus can suppress an increase of the amount of communication between the mobile terminal 2 and the server 3 due to the transmission/reception of the map information irrespective of the fact that the captured images are linked with the map information.

An explanation was given above of the communication system according to one embodiment, but the present invention is not limited to the above embodiment. For example, in the above embodiment, the server 3 has the judgment unit 313 and display position determination unit 314. However, those judgment unit 313 and display position determination unit 314 may be assembled in the mobile terminal 2 as well. In this case, when transmitting the map information to the mobile terminal 2, the server 3 transmits latitude/longitude information of points on the four corners of the north, south, east and west of the geographical range shown in the map information as well.

Further, in the above embodiment, when a plurality of album data are stored in the memory unit 21, the map information correction unit 283 may prepare the second order map information so that images included in those plurality of album data are displayed together with the map information included in any album data. In this case, the map information correction unit 283 uses the place, type, etc. as retrieval information and retrieves the image included within the range of the same map among images stored in the plurality of album data. For example, the map information correction unit 283 extracts the album data included in the album management information in which both of the type and place coincide. Then, when there are a plurality of extracted album data, on the map stored in the newest album data among those, second order map information attaching marks representing imaging locations of images stored in the extracted other album data and thumbnail images of those images is prepared. At that time, if the album data have the same map information, the map information correction unit 283 can utilize the display position information of imaging locations stored in the album data as they are. However, in a case where the stored maps differ according to album data, it is necessary to compute the display position information again. Therefore, preferably the mobile terminal 2 has the above judgment unit and display position determination unit.

Figure 10A:
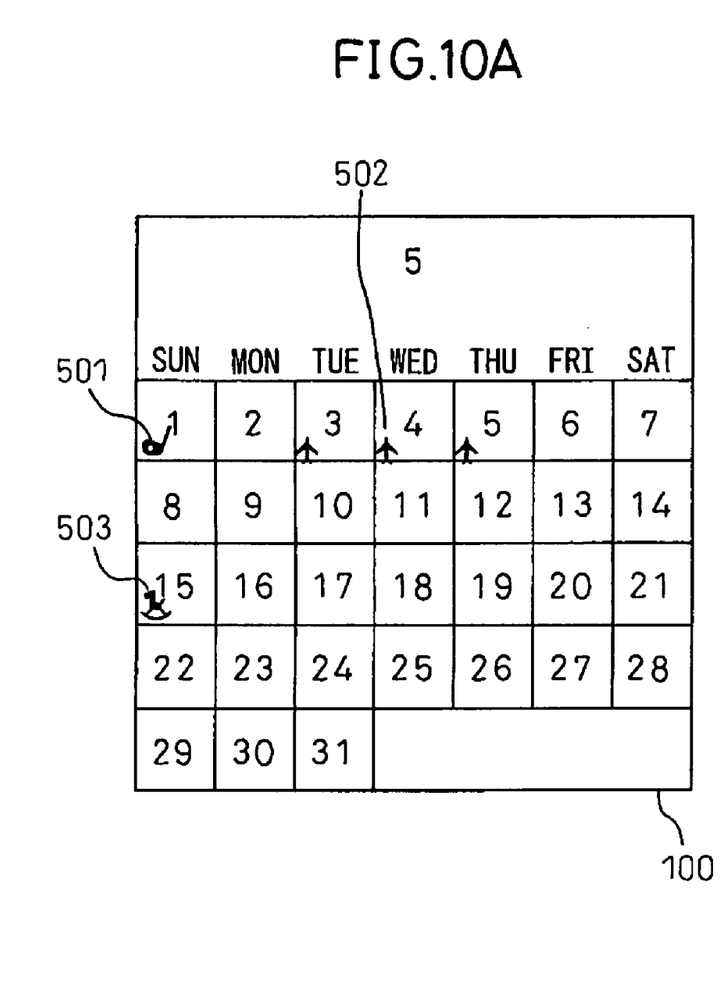
FIG. 10A is a diagram depicting an example of a display screen of a calendar application.
Figure 10B:
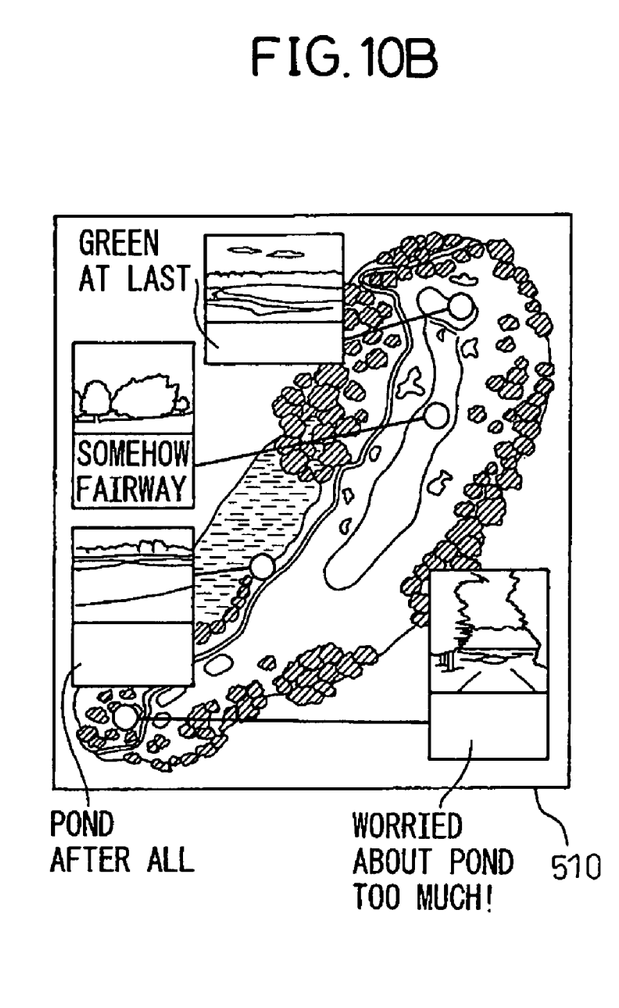
FIG. 10B is a diagram depicting an example of the display screen of an album application started up from the calendar application.

Further, in order to improve the convenience of the user, the album data may be referred to by a calendar or other application. An example of a case where the album data is called up from the calendar application is shown. FIG. 10A shows a display screen 100 of the calendar application displayed on the display 27. On that display screen 100, as one example, days in May are displayed. In fields corresponding to days, icons corresponding to the type of the album data are displayed for the days of the album data. For example, in the field of the first day, an icon 501 indicating the existence of golf type album data is displayed. Further, in the fields of the third to fifth days, icons 502 indicating the existence of the travel type album data are displayed. Further, in the field of the 15th day, an icon 503 indicating the existence of amusement park type album data is displayed. When selecting a field in which some sort of icon is displayed via the operation unit 26, second order map information 510 included in the album data as shown in FIG. 10B is displayed.

Further, in place of requesting acquisition of a map at the time of the first capture, the album management unit 282 may request the acquisition of a map from the server 3 after the end of the period managed as the album data. In this case, the mobile terminal 2 may determine the geographical range so that imaging locations of all images included in the album data are included and may make that geographical range the map designation information. In this case, by determining the geographical range so that the imaging locations located on the end most locations in the north, south, east, and west directions among imaging locations of all images become borders of that geographical range, the album management unit 282 can automatically select an adequate map that includes imaging locations of all images. The imaging locations are not concentrated at part of the map.

While the invention has been described with reference to specific embodiments chosen for purpose of illustration, it should be apparent that numerous modifications could be made thereto by those skilled in the art without departing from the basic concept and scope of the invention.

What is claimed is:

1. An image management apparatus comprising:
   a period setting unit setting a predetermined period;
   an imaging unit acquiring an image;
   a position information acquisition unit acquiring capturing position information indicating an imaging location at which an image is acquired by the imaging unit;
   an image management unit linking the image and the capturing position information;
   a map information acquisition unit acquiring map information representing a predetermined range of map designated by a user;
   a judgment unit judging whether or not the imaging location corresponding to each of a plurality of images acquired by the imaging unit in the predetermined period is covered within the designated range of the map;
   a display position determination unit determining the display position of the imaging location judged to be covered within the designated range of the map by the judgment unit among imaging locations individually corresponding to the plurality of images;
   a map correction unit receiving display position information determined by the display position determination unit and generating secondary order map information, in accordance with the display position information, by attaching a mark representing the imaging location onto a map included in the map information acquired by the map information acquisition unit, the map correction unit receiving the display position information and generating the secondary order map information only when the imaging location of the image data, captured by the imaging unit, is separated by a specified distance from the imaging location of the image data which was captured a previous time; and
   a display unit displaying the secondary order map information generated by the map correction unit.

2. An image management apparatus as set forth in claim 1, wherein, when a second image is acquired by the capturing unit during a period where the position information acquisition unit is acquiring capturing position information concerning the first image acquired by the imaging unit, the image management unit links the capturing position information concerning the first image with the second image.

3. An image management apparatus as set forth in claim 1, further including
   a supplemental information holding unit holding at least one supplemental information including information concerning a predetermined location and
   a supplemental information acquisition unit acquiring the supplemental information concerning a location matching with the imaging location indicated by the capturing position information among the supplemental information from the supplemental information holding unit.

4. An image management apparatus as set forth in claim 3, wherein when a distance between the capturing position for a first image acquired by the imaging unit and the capturing position for a second image acquired by the imaging unit is larger than a predetermined threshold value, the supplemental information acquisition unit separately acquires the supplemental information linked with the imaging location of the first image and the supplemental information linked with the imaging location of the second image and, when the distance is the predetermined threshold value or less, links the supplemental information acquired for the imaging location of the first image with the imaging location of the second image.

5. An image management apparatus as set forth in claim 4, wherein the predetermined threshold value is a diameter of the range displayed as the same coordinates in the display unit.

6. An image management apparatus as set forth in claim 3, wherein, when the difference between the capturing time for a first image acquired by the imaging unit and the capturing time for a second image acquired by the imaging unit is larger than a predetermined time difference, the supplemental information acquisition unit separately acquires the supple-mental information linked with the imaging location of the first image and the supplemental information linked with the imaging location of the second image and, when the difference is a predetermined time difference or less, links the supplemental information acquired concerning the imaging location of the first image with the imaging location of the second image.

7. An image management apparatus as set forth in claim 1, wherein
   the period setting unit sets a first period and a second period,
   the map information acquisition unit acquires first map information with respect to the first period,
   the judgment unit judges whether or not the imaging location corresponding to each of the plurality of images acquired by the imaging unit in the second period is included within the predetermined geographical range shown by the first map information,
   the display position determination unit determines the display position of the imaging location judged to be included within the predetermined geographical range by the judgment unit among imaging locations individually corresponding to the plurality of images acquired by the imaging unit in the second period, and
   the display unit displays, on the map shown on the first map information, the imaging location judged to be included within the predetermined geographical range corresponding to each of the plurality of images acquired by the imaging unit in the second period.

8. An image management system comprising:
   a first apparatus comprising
      a period setting unit setting a predetermined period,
      an operation unit receiving as input the map designation information designating a map representing a predetermined range of map designated by a user,
      an imaging unit acquiring an image,
      a position information acquisition unit acquiring capturing position information indicating an imaging location at which an image was acquired by the imaging unit,
      an imaging management unit linking the image and the capturing position information,
      a map information acquisition unit acquiring map information representing the predetermined range of the map designated by the user, a judgment unit judging whether the imaging location corresponding to each of a plurality of images acquired by the imaging unit in the predetermined period is covered within the designated range of the map, a display position determination unit determining the display position of the imaging location judged to be covered within the designated range of the map by the judgment unit among imaging locations individually corresponding to the plurality of images, a memory unit;

a map correction unit receiving display position information determined by the display position determination unit and generating secondary order map information, in accordance with the display position information, by attaching a mark representing the imaging location onto a map included in the map information acquired by the map information acquisition unit;

a display unit displaying the secondary order map information generated by the map correction unit, and a first communication unit transmitting map designation information, a map request information indicating whether or not the map is stored in the memory unit, and capturing position information corresponding to the image acquired by the imaging unit in the predetermined period; and a second apparatus comprising a second communication unit communicating with the first apparatus, a map information acquisition unit acquiring map information representing a predetermined range of map designated by the user according to map designation information received from the first apparatus, a judgment unit judging whether or not an imaging location indicated by the capturing position information is covered within the designated range of the map for the capturing position information corresponding to the image received from the first apparatus, and a display position determination unit determining a position at which an imaging location is displayed in the display unit in a case where it is judged by the judgment unit that the imaging location is covered within the designated range of the map, wherein in a case where the map request information received from the first apparatus indicates that the map is not stored in the memory unit, the second communication unit transmits the map information and the display information to the first apparatus and transmits the display position to the first apparatus in a case where the map request information indicates that the map is stored in the memory unit, and wherein the map correction unit receives the display position information and generates the secondary order map information, only when the imaging location of the image data, captured by the imaging unit, is separated by a specified distance from the imaging location of the image data which was captured a previous time.

9. An image management method comprising:

setting a predetermined period;

acquiring an image, acquiring capturing position information indicating an imaging location at which the image was acquired;

linking the image and the capturing position information;

acquiring map information representing a designated predetermined range of map designated by a user;

judging whether or not the imaging location corresponding to each of a plurality of images acquired in the predetermined period is covered within the designated range of the map;

determining a display position of the imaging location judged to be covered within the designated range of the map among imaging locations individually corresponding to a plurality of images;

correcting a map, only when the imaging location of the image data captured by the imaging unit is separated by a specified distance from the imaging location of the image data which was captured a previous time, by receiving display position information determined by said determining and generating secondary order map information, in accordance with the display position information, attached with a mark representing the imaging location onto a map included in the map information acquired by said acquiring; and displaying the secondary order map information generated by said generating.

10. An image management method as set forth in claim 9, wherein, when a second image is acquired during a period where the capturing position information concerning the first image is acquired, the image and the capturing position information are linked to link the capturing position information concerning the first image with the second image.

11. An image management method as set forth in claim 9, which further includes a step of acquiring supplemental information concerning a location matching with the imaging location indicated by the capturing position information among the supplemental information from the supplemental information holding unit holding at least one supplemental information including information concerning the predetermined location.

12. An image management method as set forth in claim 11, wherein the acquisition of the supplemental information is, in the case where the distance between the capturing position for a first image and the capturing position for a second image is larger than a predetermined threshold value, to separately acquire supplemental information linked with the imaging location of the first image and supplemental information linked with the imaging location of the second image and, in the case where the distance is the predetermined threshold value or less, to link the supplemental information acquired concerning the imaging location of the first image with the imaging location of the second image.

13. An image management method as set forth in claim 12, wherein the predetermined threshold value is the diameter of the range displayed as the same coordinates in the display unit displaying the map.

14. An image management method as set forth in claim 11, wherein the acquisition of the supplemental information is, in the case where the difference between a capturing time for a first image and a capturing time for a second image is larger than a predetermined time difference, to separately acquire supplemental information linked with the imaging location of the first image and supplemental information linked with the imaging location of the second image and, in the case where the difference is the predetermined time difference or less, to link the supplemental information acquired for the imaging location of the first image with the imaging location of the second image.

* * * * *